US011159572B2

(12) United States Patent
Sharif

(10) Patent No.: US 11,159,572 B2
(45) Date of Patent: Oct. 26, 2021

(54) METHOD TO TRANSFORM CONTEXTUAL GOVERNING POLICIES INTO KEY PERFORMANCE INDICATORS TO MEASURE EFFICACY OF THE CYBERSECURITY IMPLEMENTATION

(71) Applicant: Darien Sharif, Austin, TX (US)

(72) Inventor: Darien Sharif, Austin, TX (US)

( * ) Notice: Subject to any disclaimer, the term of this patent is extended or adjusted under 35 U.S.C. 154(b) by 0 days.

(21) Appl. No.: 16/557,138

(22) Filed: Aug. 30, 2019

(65) Prior Publication Data

US 2021/0092156 A1 Mar. 25, 2021

(51) Int. Cl.
*H04L 29/06* (2006.01)
(52) U.S. Cl.
CPC ..................... *H04L 63/20* (2013.01)
(58) Field of Classification Search
None
See application file for complete search history.

(56) References Cited

U.S. PATENT DOCUMENTS

| | | | | |
|---|---|---|---|---|
| 10,958,652 B1* | 3/2021 | Butzer | ............... | G06Q 20/405 |
| 2006/0218639 A1* | 9/2006 | Newman | ............... | G06F 21/46 |
| | | | | 726/25 |
| 2007/0288281 A1* | 12/2007 | Gilbert | ............... | G06F 21/604 |
| | | | | 705/80 |
| 2012/0224057 A1* | 9/2012 | Gill | ............... | H04L 63/102 |
| | | | | 348/143 |
| 2012/0266209 A1* | 10/2012 | Gooding | ............... | H04L 63/20 |
| | | | | 726/1 |
| 2015/0304169 A1* | 10/2015 | Milman | ............... | H04L 63/0209 |
| | | | | 709/220 |
| 2016/0359895 A1* | 12/2016 | Chiu | ............... | H04L 63/1408 |
| 2018/0013768 A1* | 1/2018 | Hunt | ............... | G06F 21/552 |
| 2019/0102440 A1* | 4/2019 | Tabak | ............... | G06Q 10/06315 |
| 2019/0102460 A1* | 4/2019 | Tabak | ............... | G06F 9/547 |
| 2019/0102560 A1* | 4/2019 | Zettel, II | ............... | G06F 11/3051 |
| 2019/0236661 A1* | 8/2019 | Hogg | ............... | H04L 63/1433 |
| 2019/0268354 A1* | 8/2019 | Zettel, II | ............... | H04L 63/20 |

* cited by examiner

*Primary Examiner* — Kaveh Abrishamkar

(57) ABSTRACT

A method for treating a cybersecurity ecosystem of an organization including indexing cybersecurity standards and grouping plurality of common policies, identifying and matching policies to single or multiple data parameters, where each data parameter yielding data from plurality of network servers is parsed through a ratio generating engine, post-tested for integrity and uniformity is classified as a key performance indicator (KPI) and packaged for presentation along with plurality of interpretation for the observer to make an informed business decision, wherein leading to actionable plurality of tasks that improves cybersecurity in the form of return on investment, posture, maturity, value chain, feedback, performance, effectiveness and implementation.

12 Claims, 11 Drawing Sheets

METHOD TO TRANSFORM CONTEXTUAL GOVERNING POLICIES INTO KEY PERFORMANCE INDICATORS TO MEASURE EFFICACY OF THE CYBERSECURITY IMPLEMENTATION

A method to transform contextual governing policies into key performance indicators to measure efficacy of the cybersecurity implementation.

CROSS REFERENCES

| U.S. Patent Documents | | |
|---|---|---|
| 7,890,869 | February 2011 | Mayer, et al. |
| 20150149613 | May 2015 | Kakadia, et al. |
| 9,426,169 | August 2016 | Zandani |
| 9,521,160 | December 2016 | Ng, et al. |
| 20160352866 | December 2016 | Gupta, et al. |
| 10,003,605 | June 2018 | Muddu, et al. |
| 10,050,989 | August 2018 | Ng, et al. |
| 10,079,859 | September 2018 | Lang, et al. |
| 10,083,481 | September 2018 | Futch, et al. |
| 10,097,421 | October 2018 | Rajagopal, et al. |

OTHER REFERENCES

1) National Institute of Standards and Technology Special Publication 800-53, Revision 4 462 pages (April 2013) URL http://dx.doi.org/10.6028/NIST.SP.800-53r4
2) ISO/IEC 27001 $2^{nd}$ Edition 2013 URL https//www.iso.org/3)
3) Payment Card Industry Data Security Standard version 3.2.1 2018 URL https://www.pcisecuritystandards.org/documents/PCI_DSS_v3-2-1.pdf
4) HIPPA Administrative Simplification Regulation Text 2013, Part 164, pp 59-68 URL https://www.hhs.gov/sites/default/files/hipaa-simplification-201303.pdf
5) Center for Internet Security Control version 7 URL https://www.cisecurity.org/controls/

INVENTION DESCRIPTION

Background of the Invention

Ever increasing cyberattacks has made it obvious that a paradigm shift needs to occur in cybersecurity approach. One such shift, though hesitantly and slowly taking place, is to exchange messages about system state, between proprietary solutions, and create a dynamic service chain that can adapt to external forces.

True, system logs are exchanged, is the very foundation for Security Information and Event Management (SIEM) correlation, but by their very nature, logs are events that have occurred in the past and no software state influencing messages are exchanged. Filling the gap, industry intellectuals responded with REpresentational State Transfer (REST), a web-based communication protocol offering hope to exchanging state. REST adoption has been slow, requiring exposing a closed software through Application Programming Interface (API).

REST allow the requesting systems to access and manipulate textual representations of web resources by using a uniform and predefined set of stateless operations such as Create, Read, Update and Delete (CRUD). Vendors implementing API and exposing CRUD operations, is happening, but exposing another gap, no two CRUD implementations are alike, and an interpreter is required to mediate, translate and transform messages.

Objective of the invention is to substitute as an information broker within an organization, collecting data through REST API, from multiple online sources, parsing, reducing, linking, transforming data along the way, and presenting as a single pane application (SPA) offering concise, intuitive, readability, especially for decision makers.

Cybersecurity standard governing bodies, that administer, regulate and publish controls, are absorbed in contextualization of multitude of policies, suited for survey style audit with a continuous improvement cycle going into months, if not years.

Objective of the invention is to create quantitative measures that are interlinked to multiple standard policies, have an identifiable representation with the vendor solutions, and through a knowledgebase offer interpretations for each of the measurement state transition.

BRIEF DESCRIPTION OF THE DRAWINGS

The accompanying drawings further describe the invention.

DETAILED DESCRIPTION

Figure 1:
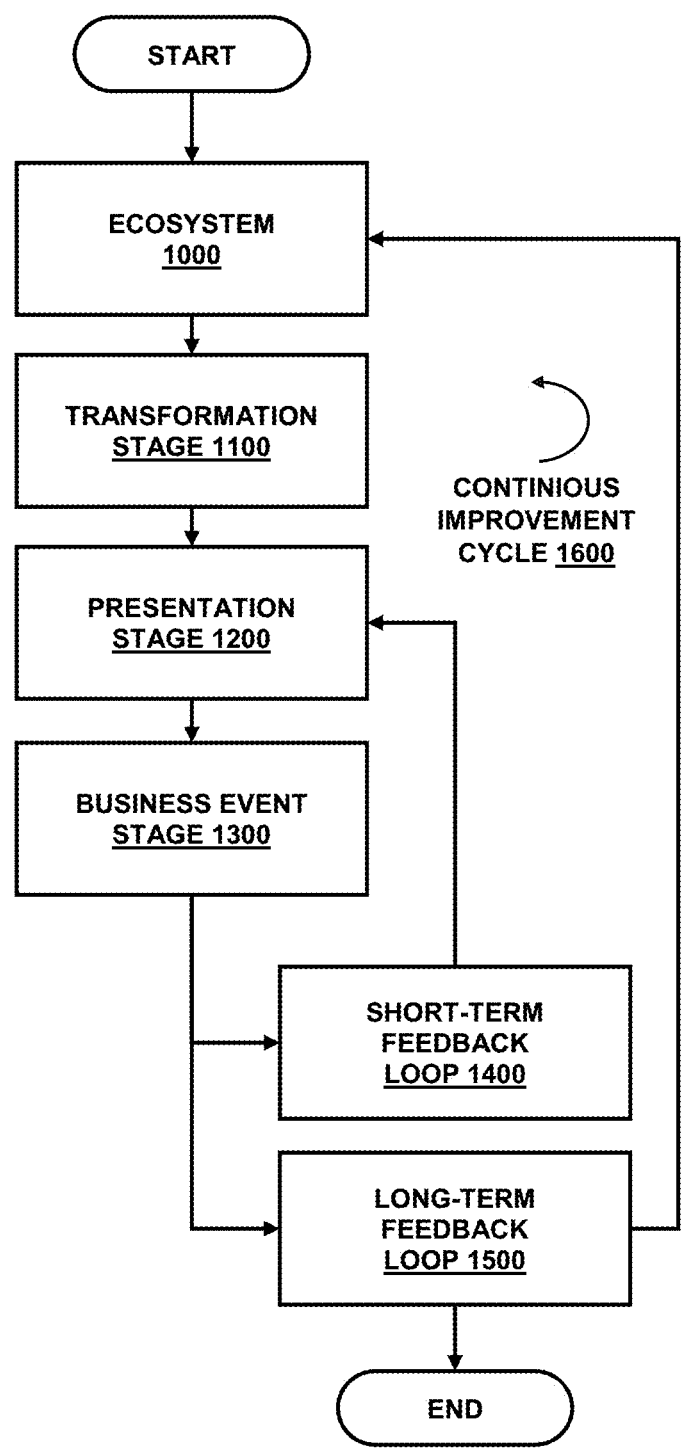
FIG. 1 illustrates a high-level flowchart for a method.

Exemplary embodiments of the invention will be described with reference to the accompanying drawings. Like items in the drawings are denoted by the same reference numbers throughout the figures for consistency.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method for transforming contextual cybersecurity standard governance policies into qualitative data, for observation and making informed decisions leading to actions looping back into an ecosystem, as feedback, for continuous improvement to a cybersecurity implementation within an organization.

FIG. 1 shows a typical continuous improvement cycle (1600) that acts on an ecosystem (1000), leading to transformation (STAGE 1100) where contextual standard control policies are subjected to multiple interlinked steps, yielding quantifiable composite numerical values referred to as Key Performance Indicators (KPI). Generation of multiple KPIs and representing them as Graphical User Interface (GUI)

objects for observers of an organization to make an informed decision takes place at the presentation (STAGE 1200), triggering a business event (STAGE 1300) and multitude of actions. Actions leading to changing operational parameters, with immediate impact, are deemed short-term feedback (LOOP 1400). Actions leading to changing the ecosystem (1000), with gradual impact are deemed long-term feedback (LOOP 1500). Both feedback loops form part of the continuous improvement cycle (1600) with the goal of optimizing a cybersecurity implementation within an organization.

Transformation Stage

Figure 2:
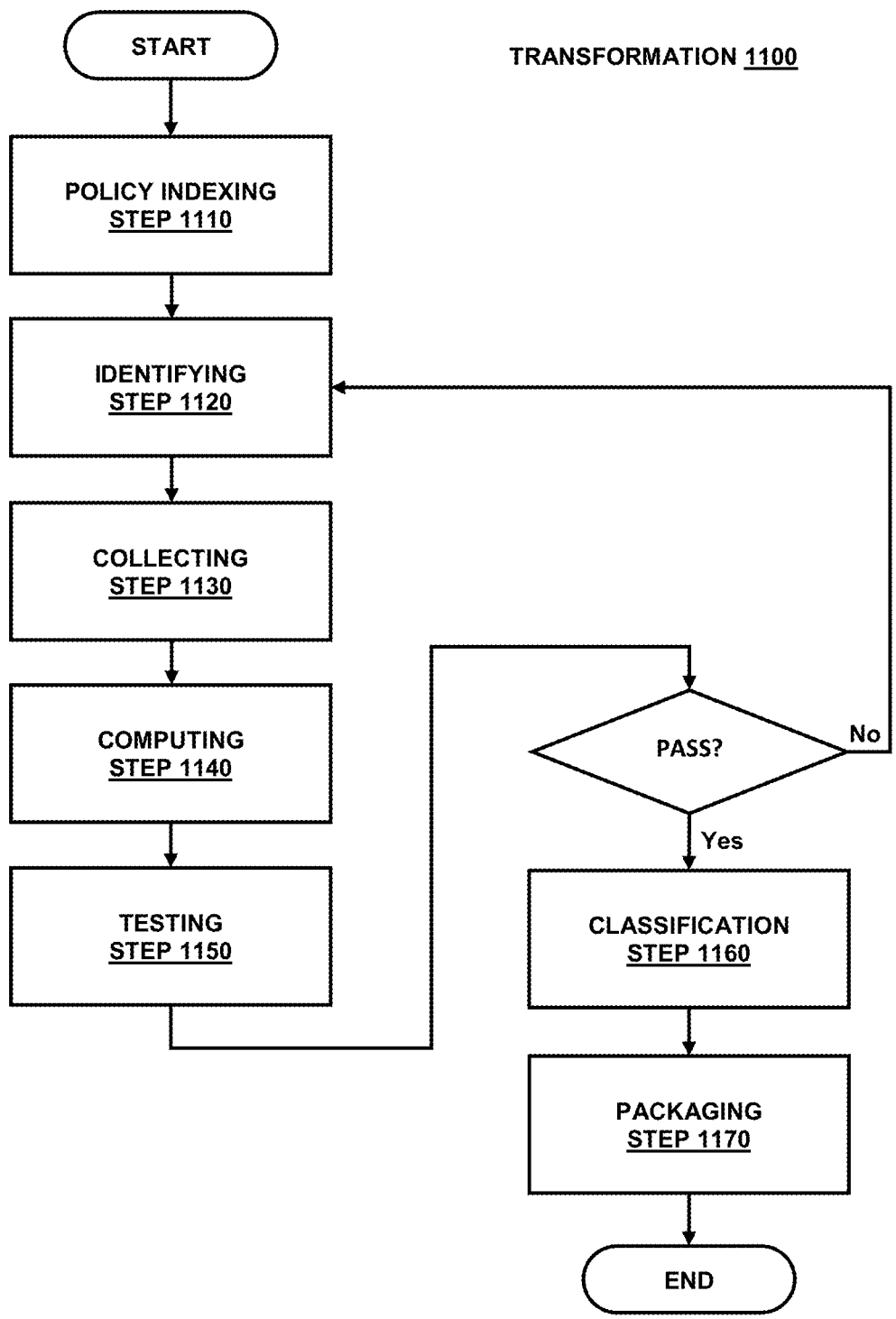
FIG. 2 illustrates decomposition of transformation stage.

FIG. 2 shows a flow chart in accordance with one or more embodiments of the invention. The flow chart decomposes the transformation (STAGE 1100) in to preferred steps, starting with policy indexing (STEP 1110). Using cybersecurity standards, from publishing bodies listed in TABLE 1, policy controls and sub-controls are matched and policies that are common are linked across all standards, common policies with two or more links and matching Center for Internet Security (CIS) controls is selected for inclusion for further processing.

TABLE 1

List of Cybersecurity Standard Bodies.

| Abbreviation | Description |
| --- | --- |
| NIST | National Institute of Standards and Technology, a non-regulatory agency of the U.S. Department of Commerce, |
| ISO | International Organization for Standardization (ISO), publishes ISO/IEC 27000 family of standards, |
| PCI DSS | Payment Card Industry Data Security Standard (PCI DSS), administer branded credit card industry, |
| HIPAA | Health Insurance Portability and Accountability Act (HIPAA), regulates U.S. health insurance and electronic data handling policies, |
| CIS | Center for Internet Security (CIS), promotes best practices for cyber defense. |

In TABLE 2, as an example, the mapping of CIS Critical Security Control (CSC) one is made to NIST Cybersecurity Framework (CSF) sub-function Identity (ID), category Asset Management (AM), sub-category one (ID.AM-1) and likewise to other standards.

TABLE 2

List of matching policy to CIS Control One.

| Standard | Section | Description |
| --- | --- | --- |
| CIS v7 | CSC 01 | Inventory and control of hardware assets. |
| NIST CSF v1.1 | ID.AM-1 | Physical devices and systems within the organization are inventoried. |
| NIST 800-53 rev4 | IA-3 | The information system uniquely identifies and authenticates specific and/or types of devices before establishing a local or remote network connection. |
| ISO 27001:2013 | A.9.1.2 | Users shall only be provided with access to the network and network services that they have been specifically authorized to use. |

TABLE 2-continued

List of matching policy to CIS Control One.

| Standard | Section | Description |
| --- | --- | --- |
| PCI DSS 3.2 | — | No matching policy defined. |
| HIPPA | 164.308 (a)(4)(ii)(B) | Implement policies and procedures for granting access to electronic protected health information, for example, through access to a workstation, transaction, program, process, or other mechanism. |

In identifying (STEP 1120), there are five identification procedures:
  i. Identification of Sub-control,
  ii. Identification of Technology,
  iii. Identification of Technology Providers,
  iv. Identification of Keywords,
  v. Identification of Data Parameters.

In the first identification procedure, categories with sub-categories having multiple sub-controls, come pre-classified into functional groups:
  i. Identify,
  ii. Respond,
  iii. Protect.

The "protect" sub-controls are selected for further processing, with the understanding that proceeding sub-control functional groups "identify" and "respond" are encapsulated, amalgamated or implied in the "protect" group.

In TABLE 3 as part of our continuation of the example, CIS CSC 01 sub-controls are list along with functions.

TABLE 3

List of CIS Sub-Controls for CSC 01.

| Sub-Control | Function | Description |
| --- | --- | --- |
| 1.1 | Identify | Utilize an Active Discovery Tool |
| 1.2 | Identify | Use a Passive Asset Discovery Tool |
| 1.3 | Identify | Use Dynamic Host Configuration Protocol (DHCP) Logging to Update Asset Inventory |
| 1.4 | Identify | Maintain Detailed Asset Inventory |
| 1.5 | Identify | Maintain Asset Inventory Information |
| 1.6 | Respond | Address Unauthorized Assets |
| 1.7 | Protect | Deploy Port Level Access Control |
| 1.8 | Protect | Utilize Client Certificates to Authenticate Hardware Assets |

In the second identification procedure, sub-controls with the "protect" functional classification are linked to key technology.

Continuing with our example, in TABLE 3, sub-control 1.7, explicitly states Port Level Access Control or more commonly referred to as Network Access Control (NAC). NAC technology is linked to Institute of Electrical and Electronics Engineers (IEEE) 802.1x standard which feeds into next procedure to determine who are the major players.

In the third identification procedure, research and advisor organizations publishing annual reports on technology sector, yield top players in the identified technology sector.

Enduring with our example, Gartner Inc., a worldwide research body publishing Magic Quadrant Reports on specific technology, show for NAC who are the top players, who has moved up in the rank, who has merged or got acquired, and who slipped in the rank from previous report or year.

In the fourth identification procedure, keywords are identified from the sub-controls and matched to identified commercial products having exposed data libraries.

Enduring with our example, reading description in TABLE 3 produces keywords, asset, inventory, discovery, authenticated, and unauthorized.

In the fifth identification procedure, searching identified NAC data libraries and matching them to keywords allows fabrication of data parameters that produce numerical result.

Continuing with our example, keywords are matched to what is available in multiple data parameters narrows the identification to two parameters shown in TABLE 4.

TABLE 4

List of data parameters mapping to CIS CSC 01.

| Keyword | Data Parameter |
| --- | --- |
| Authorized | Authorized Device Count in Asset Inventory |
| Unauthorized | Unauthorized Device Count in Asset Inventory |

In collection (STEP 1130), data for the identified data parameters is collected on the preferred hour, in accordance with the following classification:
i. Simple,
ii. Compound,
iii. Complex.

In the first collection procedure, simple, data is collected using a single communication protocol, resulting in a response containing the required numerical value. In the second collection procedure, compound, data is collected using a single communication protocol, resulting in multiple responses from which the required numerical value is derived, using a mathematical function. In the third collection procedure, complex, data is collected using multiple communication protocols, resulting in complex data extraction, manipulation and parsing steps, prior to yielding the required data parameters.

Following with our example, using REST API communication protocol, for a simple collection, a NAC solution from a vendor returns authorized and unauthorized device count in numerical value. Example for a compound collection by another vendors NAC implementation requires collecting authorized device count and total, extracting unauthorized device count through subtraction. Unauthorized device count is not available through their REST API implementation. Example for a complex collection, involves multitude of network protocols, such as Structured Query Language (SQL), Simple Object Access Protocol (SOAP), Simple Network Management Protocol (SNMP) are engaged to extract raw data, build and parse through filters to finally produce required data parameters as numerical values.

In computing (STEP 1140), data parameters assigned with variables are subjected to ratio generation rules prior to building the ratio:
i. Undefined,
ii. Infinity,
iii. Bounded,
iv. Black Bag.

In the first rule, as shown by equation (1), both the numerator (y) and the denominator (x) can have the value zero, simultaneously, resulting in an expression that has no meaning in arithmetic. However, the undefined value, that is generated, provides information on the state of the ratio (R) and indication of the underlying data parameter values.

$$R = \frac{y}{x} \quad (1)$$

In the second rule, as shown by equation (2), both the numerator (y) and the denominator (x) can have the value zero, but separately, resulting in an expression that is zero if numerator is zero or infinite if denominator is zero. Once again, infinity shows up as undefined in most software representation of mathematical functions, but it provides information on the state of the ratio (R) and indication of the underlying data parameter values.

$$R = \frac{y}{x} \quad (2)$$

In the third rule, as shown by equation (3), the ratio (R) is not allowed to exceed one and prior knowledge exists about the total units in a system. The numerator (x) is generally represented by a data parameter and the denominator by the sum of the data parameters (y+x).

$$R = \frac{y}{y + x} \quad (3)$$

In the fourth rule, as shown by equation (4), the ratio (R) is not allowed to exceed one and no prior knowledge exists about the total units in a system. The numerator is generally represented by a difference between data parameter (y-x) and the denominator by the sum of the data parameters (y+x). The ratio is based on measuring input and output of a system without knowing how many units are in the system, hence the black bag reference.

$$R = \frac{y - x}{y + x} \quad (4)$$

Since equation (4) has the tendency to swing from a negative value to a positive value, later in the presentation (STAGE 1200), embodiment of the equation needs to compensate for the swing.

Continuing with our example, assigning variables x and y, as shown in TABLE 5, show that from a cybersecurity standpoint, unauthorized devices in an ecosystem are of interest that needs to be measured. Unauthorized device count can be zero, the ideal condition, or greater than zero, and is selected to be the numerator.

TABLE 5

List of data parameters mapping to CIS CSC 01.

| Variable | Data Parameter |
| --- | --- |
| x | Authorized Device Count in Asset Inventory |
| y | Unauthorized Device Count in Asset Inventory |

In an initial condition, both numerator (y) and denominator (x) values have seed value of zero, hence undefined rule applies. Post initial condition, numerator or the denominator could have the value of zero, hence infinite rule also applies. Numerator can be equal to, greater than or less than the denominator resulting in equation (5), where ratio (R), equal to unauthorized device count (y) divided by authorized device count (x).

$$R = \frac{\text{unauthorized device count } (y)}{\text{authorized device count } (x)} \quad (5)$$

In testing (STEP 1150), the ratio is subjected to assessment procedures in-order to generate uniform ratios as percentage, for intuitive human readability:

i. Normalization, ii. Ideal.

In the first assessment procedure, the ratio (R) is treated for greater then one test. In the treatment if the ratio can generate a value greater than zero then normalization of ratio (Rn) under true conditions as shown in equation (6) is applied to bound the outcome within zero and one. Normalization treatment encompasses ratio divided by square root of the sum of square of the ratio plus graph co-efficient factor (g), graph co-efficient factor defines the scale of the final embodiment, under false conditions the ratio is accepted as is, resulting in the ratio bounded within zero and one.

$$R_n = \begin{cases} \frac{R}{\sqrt{R^2 + g}} & \text{if } R > 0 \\ R & \text{if } R < 0 \end{cases} \quad (6)$$

In the second assessment procedure, the ratio is treated for zero as ideal condition test. In other words, zero is the ideal condition that is being strived for by an organization. Ideal ratio ($R_i$) as shown in equation (7), under false conditions treatment includes reversing the value by subtracting from one, under true condition the ratio (R) is accepted as is, post conditional testing, both ratios are multiplied by one hundred yielding the value as a percentage.

$$R_i = \begin{cases} (1-R)*100 & \text{if ideal condition} \neq 0 \\ R*100 & \text{if ideal condition} = 0 \end{cases} \quad (7)$$

Each of the two assessment procedures can be applied separately or as a series by executing normalization followed by reversal using equation (8).

$$R_i = \left(1 - \frac{\frac{y}{x}}{\sqrt{\left(\frac{y}{x}\right)^2 + g}}\right) * 100 \quad (8)$$

A ratio that is not passing any of the assessment and consequently the standard policy is considered a failure and looped back for re-identifying (STEP 1120).

Keeping with the example, equation (9) is constructed where the numerator, which in this case is unauthorized device count (y) can be greater than the denominator, which in this case is authorized device count (x), resulting in a value greater than one. Since the first condition is true normalization procedure is applicable. The goal is to have zero unauthorized devices (y) in an ecosystem, hence achieving zero is the ideal ratio condition ($R_i$) resulting in not applying any reversal treatment.

$$R_i = \left(\frac{\frac{y}{x}}{\sqrt{\left(\frac{y}{x}\right)^2 + g}}\right) * 100 \quad (9)$$

In the classification (STEP 1160), data parameter unit values for numerator and denominator determine into which bin the ratio will be placed, index, drift, or rate. Rule for placing in the first bin, index, is satisfied when all data parameters have the same unit value but diametrically opposite. Rule for placing in the second bin, drift, applies when data parameters have the same unit value but represent a portion of a total. The third rule, for rate, applies when the data parameters have different unit values.

Keeping with our example, the two data parameters shown in TABLE 5, have the same unit values, that is device count, and diametrically opposite, authorized and unauthorized. The ratio is tagged as an index.

In the packaging (STEP 1170), the ratio is subjected to wrapping procedures that tie the ratio to a naming convention that is intuitive, familiar and linked to a data set:

i. Nomenclature, ii. Data Warehousing.

In the first wrapping procedure, combining identified technology name or part thereof, with the bin selected at the classification (STEP 1160), produces the name of the ratio or also known as the Key Performance Indicator (KPI) for the linked policy, linked technology, and vendor solution. Packaging fulfils the first objective of the invention to generate policy linked qualitative data that can be used to gauge the performance of a given technology implementation.

In the second wrapping procedure, data collected on the hour at the collection (STEP 1140) is stored in a data warehouse into distinct periodic hourly, daily, weekly and monthly buckets, for later retrieval.

Continuing with our example, combining Network Access and Index produces Network Access Index (NAI) as the title for the new KPI. Data can be retrieved for the NAI in sets of hourly, daily, weekly and monthly sets. Generation of the data sets concludes transformation (STAGE 1100).

Presentation Stage

Figure 3:
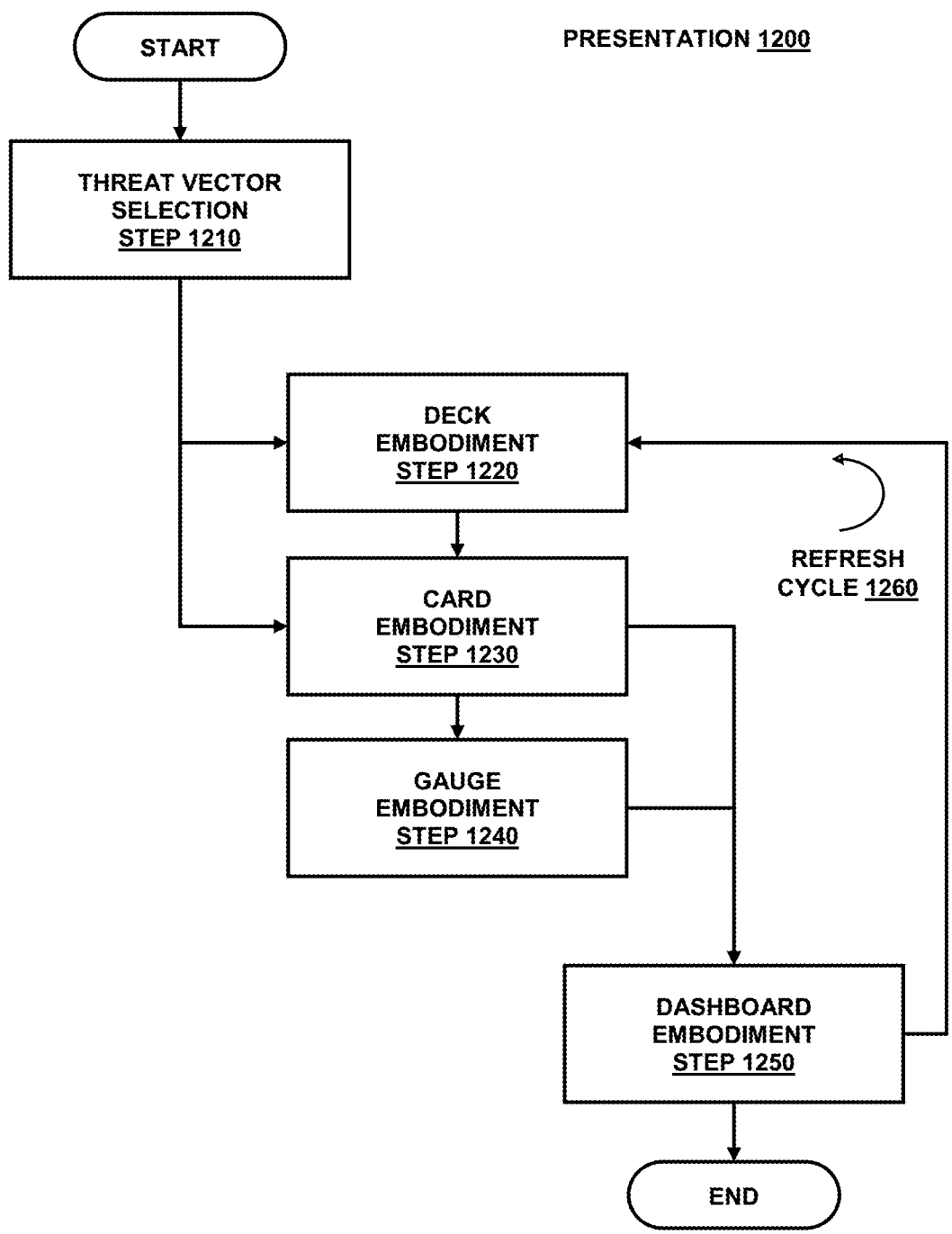
FIG. 3 illustrates decomposition of presentation stage.

FIG. 3 shows a flow chart in accordance with one or more embodiments of the invention. The flow chart decomposes the presentation (STAGE 1200) in to steps, starting with threat vector selection (STEP 1210). Cyberattacks generally follow a pattern and these patterns are associated with the frequency of the data breaches occurring within a business sector. Breaches are tied to motives that generally are for financial gains with lesser reasons comprising essentially of, espionage, fun, grudges or pushing an ideology, the entire relationship encapsulated in TABLE 6.

TABLE 6

| | List of Pattern Relationship. | |
|---|---|---|
| Pattern | Financial Motive Impacting Business Sectors | Others Motives Impacting Business Sectors |
| crimeware | Education Financial & Insurance Information Manufacturing | |

TABLE 6-continued

List of Pattern Relationship.

| Pattern | Financial Motive Impacting Business Sectors | Others Motives Impacting Business Sectors |
|---|---|---|
| denial of service | Government Retail Healthcare Information Government | |
| espionage | Education Healthcare Information | Financial & Insurance Manufacturing Government Retail |
| lost and stolen assets | Entertainment Education Financial & Insurance Information Manufacturing Government | Healthcare |
| miscellaneous errors | Entertainment Financial & Insurance Information Manufacturing | |
| payment card skimmers | Entertainment Government | Retail |
| point of sale | Financial & Insurance Healthcare Retail | |
| privilege misuse | Entertainment Education Manufacturing Retail | |
| web application attacks | Entertainment | |

Association of patterns listed in TABLE 6 with CIS controls listed in TABLE 7 create threat vectors listed in TABLE 8 that can be selected by pattern, by business sector, and by motive. Using CIS controls, the relationship is further extended to other published standards as shown in TABLE 2 for one control.

TABLE 7

List of CIS Controls and their Grouping.

| Group | Number | Description |
|---|---|---|
| Basic | 01 | Inventory and Control of Hardware Assets |
| | 02 | Inventory and Control of Software Assets |
| | 03 | Continuous Vulnerability Management |
| | 04 | Controlled use of Administrative Privileges |
| | 05 | Secure Configuration for Hardware and Software |
| | 06 | Maintenance, Monitoring & Analysis of Logs |
| Foundational | 07 | Email & Web Browser Protection |
| | 08 | Malware Defenses |
| | 09 | Limitation & Control of Network Services |
| | 10 | Data Recovery Capabilities |
| | 11 | Secure Configuration for Network Devices |
| | 12 | Boundary Defense |
| | 13 | Data Protection |
| | 14 | Controlled Access Based on Need to Know |
| | 15 | Wireless Access Control |
| | 16 | Account Monitoring and Control |
| Organizational | 17 | Implement a Security Awareness Training Program |
| | 18 | Application Software Security |
| | 19 | Incident Response and Management |
| | 20 | Penetration Tests & Red Team Exercise |

TABLE 8

List of Threat Vector and CIS Control (Basic) Relationship.

| Threat Vector Pattern | CIS Control |
|---|---|
| crimeware | 01 - Inventory and Control of Hardware Assets |
| | 02 - Inventory and Control of Software Assets |
| | 03 - Continuous Vulnerability Management |
| | 04 - Controlled use of Administrative Privileges |
| denial of service | 01 - Inventory and Control of Hardware Assets |
| | 02 - Inventory and Control of Software Assets |
| | 04 - Controlled use of Administrative Privileges |
| espionage | 01 - Inventory and Control of Hardware Assets |
| | 02 - Inventory and Control of Software Assets |
| | 03 - Continuous Vulnerability Management |
| | 04 - Controlled use of Administrative Privileges |
| | 05 - Secure Configuration for Hardware and Software |
| | 06 - Maintenance, Monitoring & Analysis of Logs |
| lost and stolen assets | 01 - Inventory and Control of Hardware Assets |
| | 02 - Inventory and Control of Software Assets |
| miscellaneous errors | 01 - Inventory and Control of Hardware Assets |
| | 02 - Inventory and Control of Software Assets |
| | 03 - Continuous Vulnerability Management |
| | 04 - Controlled use of Administrative Privileges |
| | 05 - Secure Configuration for Hardware and Software |
| payment card skimmers | 01 - Inventory and Control of Hardware Assets |
| | 02 - Inventory and Control of Software Assets |
| | 03 - Continuous Vulnerability Management |
| | 04 - Controlled use of Administrative Privileges |
| | 05 - Secure Configuration for Hardware and Software |
| | 06 - Maintenance, Monitoring & Analysis of Logs |
| point of sale | 01 - Inventory and Control of Hardware Assets |
| | 02 - Inventory and Control of Software Assets |
| | 03 - Continuous Vulnerability Management |
| | 04 - Controlled use of Administrative Privileges |
| | 05 - Secure Configuration for Hardware and Software |
| privilege misuse | 01 - Inventory and Control of Hardware Assets |
| | 02 - Inventory and Control of Software Assets |
| | 03 - Continuous Vulnerability Management |
| | 04 - Controlled use of Administrative Privileges |
| web application attacks | 01 - Inventory and Control of Hardware Assets |
| | 02 - Inventory and Control of Software Assets |
| | 03 - Continuous Vulnerability Management |

TABLE 8-continued

List of Threat Vector and CIS Control (Basic) Relationship.

| Threat Vector Pattern | CIS Control |
|---|---|
| | 04 - Controlled use of Administrative Privileges |
| | 05 - Secure Configuration for Hardware and Software |

Continuing with our example, a deck is constructed by selecting crimeware as the threat vector as area of interest. Since "crimeware" is represented by the first four control as shown in TABLE 8, this includes the first CIS control "Inventory and Control of Hardware Assets" and through association the KPI prepared in the packaging (STEP 1170).

Figure 4:
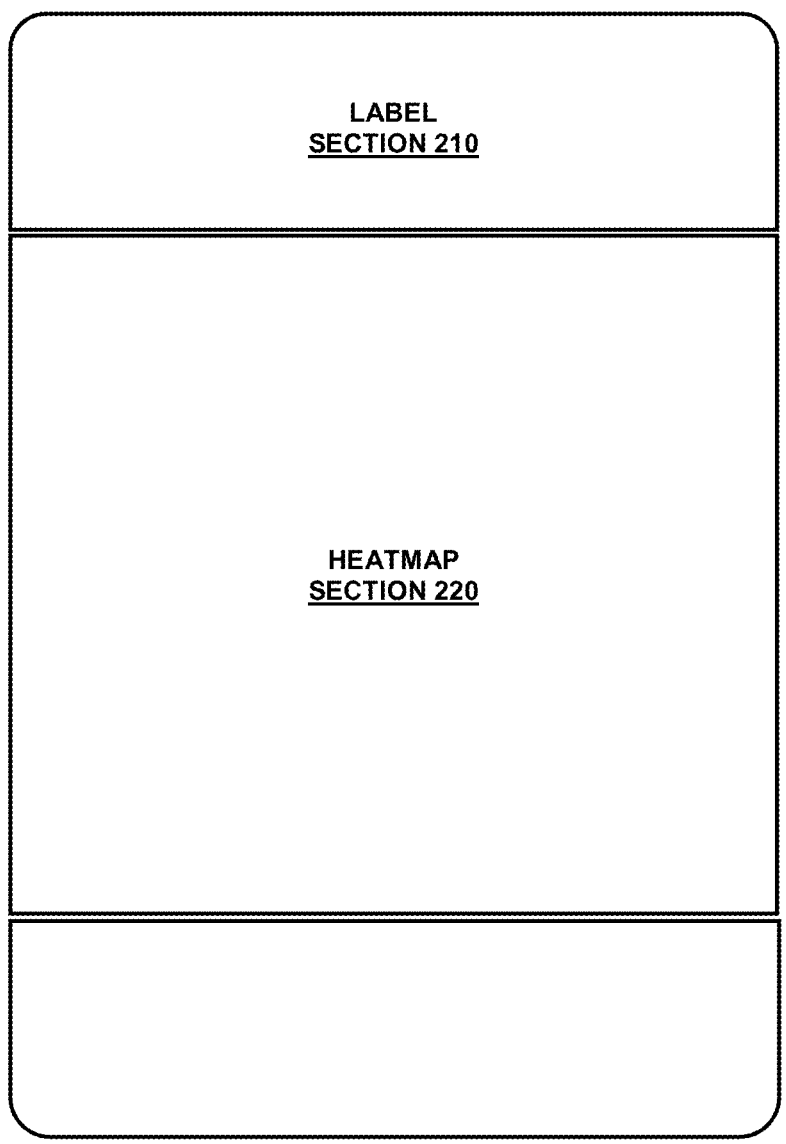
FIG. 4 illustrates an embodiment of a deck.

In the deck embodiment (STEP 1220), representation of the deck is determined by what has been selected at the threat vector selection (STEP 1210). The selection determines what controls will be consumed and which standard will be used. The selection is cosmetic and can be changed without impacting transformation (STAGE 1100), the purpose is to narrow and focus to a specific pattern, motive, sector or CIS controls. Embodiment of a deck as shown in FIG. 4 has label (SECTION 210) constituting of a contextual title and color representing summarized state for all underlying CIS controls selected for the deck, and a heatmap (SECTION 220) constituting a graphical representation of selected CIS controls where the individual CIS control reference number contained in a matrix are represented as state colors for each selected CIS control.

Ongoing with our example, the deck label is set to "crimeware" and heatmap shows a 4×4 matrix with numbers 01, 02, 03 and 04, representing the four CIS controls associated with "crimeware". Each matrix box has a background color representing state of the CIS control. Initial conditions will find background color to be gray.

Figure 5:
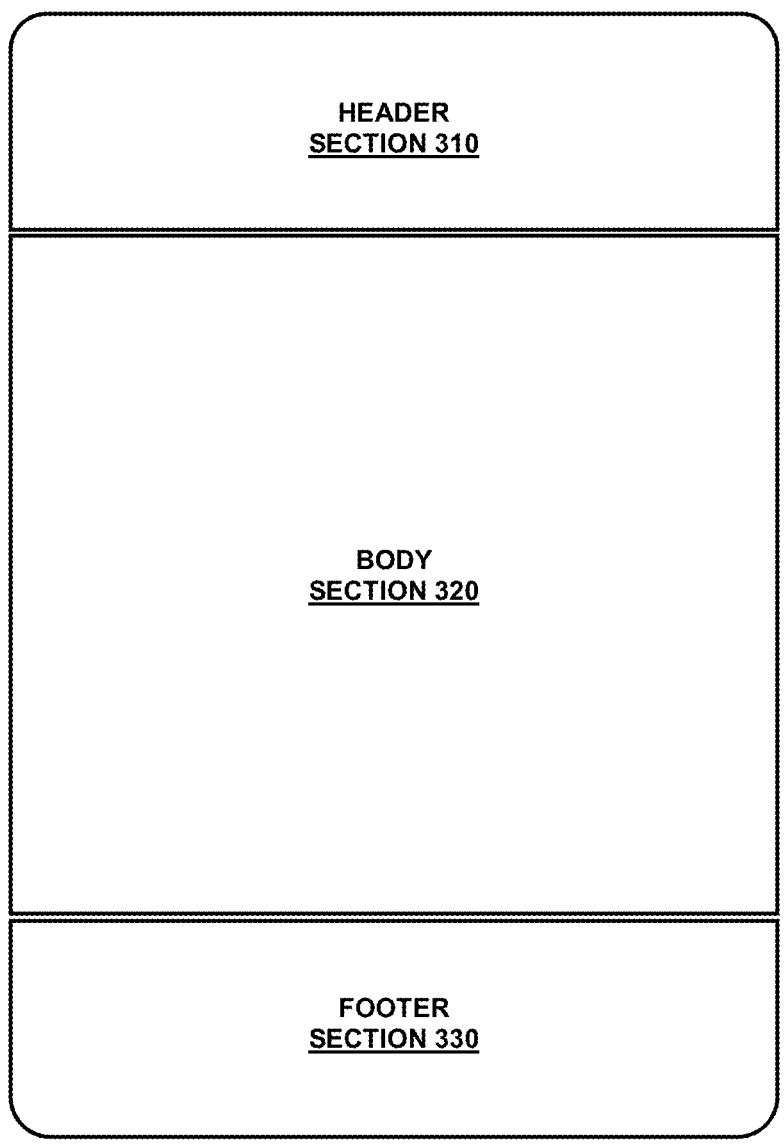
FIG. 5 illustrates an embodiment of a card.
Figure 6:
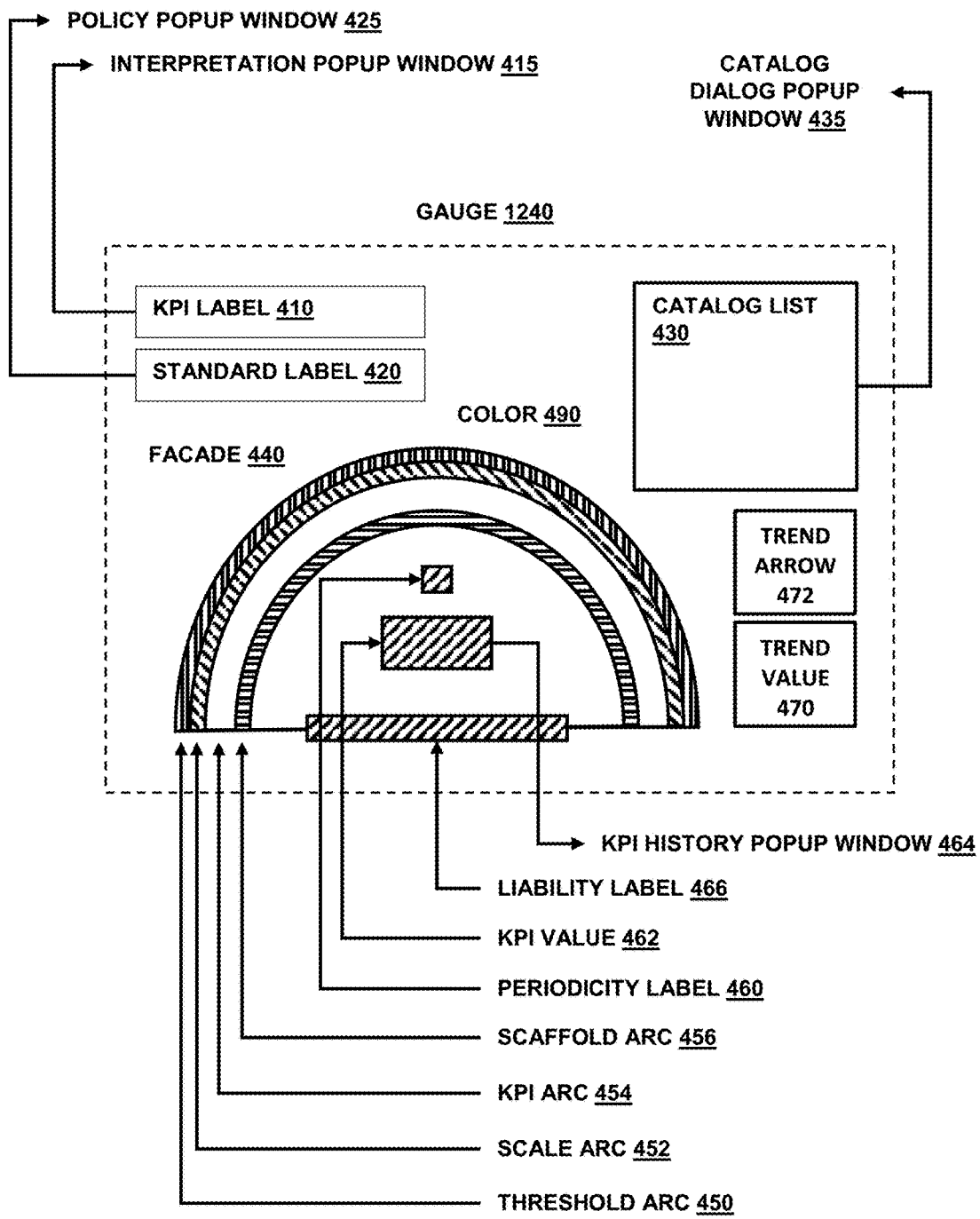
FIG. 6 illustrates an embodiment of a gauge.
Figure 7:
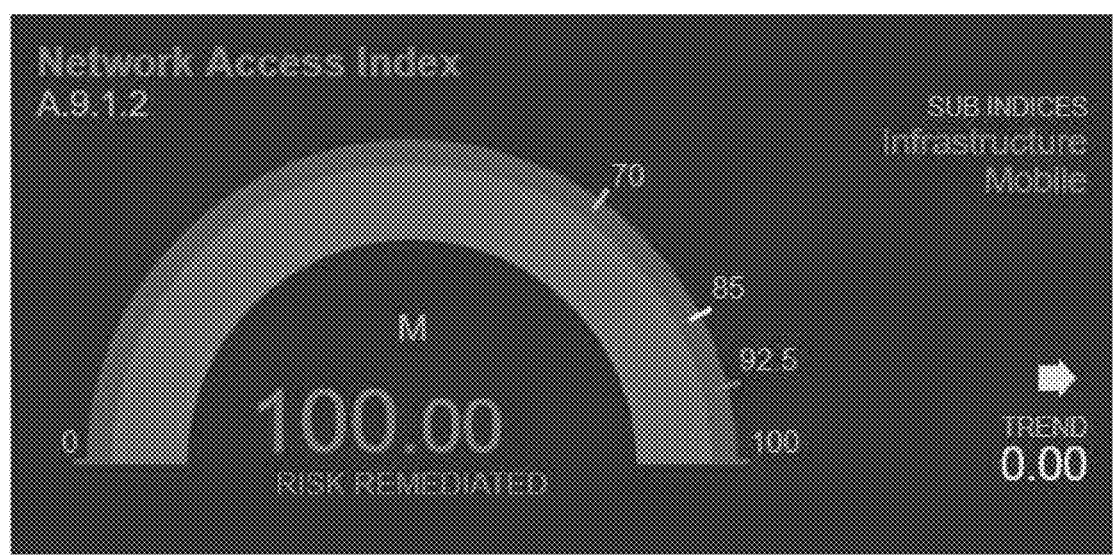
FIG. 7 as an example a screenshot of an actual gauge.

In the card embodiment (STEP 1230), each card is representing a CIS Control that is included within a deck, which through associating is representing selected threat vectors. Card structure, as shown in FIG. 5, is broken down into sections, header (SECTION 310) constitutes a contextual representation of a CIS control and background color representing summarized state for all underlying sub-controls representing the said CIS control, body (SECTION 320) constitutes of single or multiple KPIs representing the said CIS control, and footer (SECTION 330) is embodying legends, color code explanation, and abbreviation description.

Rolling with our example, the first card is rendered, representing the first CIS CSC 01 control. Incidentally, the said control consists of two KPIs, "Network Access Index" and "Approval Drift". The example is leading with just the first KPI.

In the gauge embodiment (STEP 1240), within the body (320) of a card, there can be single or multiple gauges, where each gauge is representing a KPI. Each gauge is represented by a façade (440) holding multitude of GUI components:

i. KPI Label (410),
ii. Standard Label (420),
iii. Catalog List (430),
iv. Threshold Arc (450),
v. Scale Arc (452),
vi. KPI Arc (454),
vii. Scaffold Arc (456),
viii. Periodicity Label (460),
ix. KPI Value (462),
x. Liability Label (466),
xi. Trend Value (470),
xii. Trend Arrow (472).

Embodiment of the KPI label (410) constitutes representation of a contextual label generated at the packaging (STEP 1170), as the KPI title for the gauge. The title font color (490) is signifying the state of the KPI, and connecting to a best-practice knowledge base as a popup window offering possible plurality of interpretations (415) associated with the said KPI and the current state. As the state changes, so does the font color (490) and offered interpretation.

Embodiment of the standard label (420) constitutes of representing the policy reference identified in policy indexing (STEP 1110) from a standard listed in TABLE 1 and linked to the KPI. The label is connecting to the contextual representation of the policy as a popup window (425) that can be expanded and contracted through "click" interaction. On changing the standard listed in TABLE 1, the referenced policy, the label, and associated context changes to reflect the new standard selected.

Embodiment of the catalog list (430) constitutes of representing sub-elements of a KPI, where each element has its own label, state color coding and a catalog dialog popup window (435). Each popup window is being used to embody secondary information in the form of dials, maps, tables, graphs and charts. Each entry in the catalog has an associated weight that is distributed evenly under the default condition. On inclusion of a new entry in the catalog list (430) the weighs are automatically calculated and evenly redistributed. Weights can be manually assigned and a particular list entry allotted more d a particular list entry allotted more or less weight and all other list entries having their weights recomputed and reassigned as per weighted mean average as shown in equation 10).

$$R = \Sum_{i=1}^{n} w_i' R_i \qquad (10)$$

Where (R) is the aggerate KPI value equal to the total sum of the number of entries in the catalog (n), as a product between the weight prime (w') and each associated KPI value ($R_i$). Weight prime (w') is represented by equation (11).

$$w_i' = \frac{w_i}{\sum_{j=1}^{n} w_j} \qquad (11)$$

Where weight prime (w') equals a ratio of a weight ($w_i$) over sum of all the weights in a catalog.

Post weight re-assignment validations the sum of all weight primes (w') must be equal to one, equation (12) must be satisfied. If the condition is false, the weights are recomputed, otherwise if the condition is true, then each weight prime (w') is converted to a percentage for easier human readability.

$$\Sum_{i=1}^{n} w_i' = 1 \qquad (12)$$

Embodiment of the threshold arc (450) constitutes of representing a gauge divided into discrete threshold ranges, forming a spectrum of colors referenced as red, amber, yellow and green, where amber start range, as default, is set to a seed value (a), as well as definable by the user as part of feedback control to adjust the said KPI, all other threshold ranges (T) are computed through an arithmetic-geometric series equation (13) using amber seed value (a) as starting point on a linear scale going from 0 to 100.

$$T_n = \frac{1}{2^n}(a + 2^n * 100 - 100) \qquad (13)$$

Where when n=0, $T_0$ represents amber threshold value, when n=1, $T_1$ represents yellow threshold value and when n=2, $T_2$ represents green threshold value.

Red threshold range starts from zero, inclusive, and ends at $T_0$ exclusive.

$$\text{Range}_{red} = [0, T_0 - 1] \qquad (14)$$

Amber threshold range starts from $T_0$, inclusive, and ends at $T_1$ exclusive.

$$\text{Range}_{amber} = [T_0, T_1 - 1] \qquad (15)$$

Yellow threshold range starts from $T_1$, inclusive, and ends at $T_2$ exclusive.

$$\text{Range}_{yellow} = [T_1, T_2 - 1] \qquad (16)$$

Green threshold range starts from $T_2$, inclusive, and ends at 100 mark, exclusive.

$$\text{Range}_{green} = [T_2, 100] \qquad (17)$$

Embodiment of the Scale arc (452) constitutes of representing a graduation arc, with tick marks starting from 0 and ending in 100. The number of graduations equals normalization procedure's co-efficient factor (g) set at the testing (STEP 1150).

Embodiment of the KPI arc (454) constitutes of representing an arc rendered on the scale matching the current value of the KPI. KPI arc color (490) corresponds to the threshold range spectrum the current KPI value is falling under.

Embodiment of the scaffold arc (456) constitutes of representing secondary information rendered along the KPI arc. Industry best-practice, trend within a business sector, contextual representation of data polarity, contextual representation of diametric actions or concepts, can be considered as secondary information rendered along an arc.

Embodiment of the periodicity label (460) constitutes of representing the selected time period for the KPI which is indicated in the form of H for hourly, D for daily, W for weekly, and M for monthly. The underlying periodic data sets are retrieved from the data warehouse defined at the packaging (STEP 1170).

Embodiment of the KPI value (462) constitutes of representing the numerical computed value and the color (490) of the font set to the threshold range the current value is falling under. The value is linked to a popup window displaying historical data as a time-series graph (464), with value plotted on the y-axis and time, set to the periodicity label (460), plotted on the x-axis.

Embodiment of the liability label (466) constitutes of representing a contextual text patterns matching color established by the threshold range being engaged by the KPI arc. Text patterns, as messages, matching to specific colors, which in turn are linked to the KPI value color (490), are shown in TABLE 9.

TABLE 9

List of colors and matching messages.

| Color | Message |
| --- | --- |
| Red | Actual Liability |
| Amber | Potential Liability |

TABLE 9-continued

List of colors and matching messages.

| Color | Message |
| --- | --- |
| Yellow | Limited Risk |
| Green | Risk Remediated |

The level of risk being accepted is dependent on the initial seed value set for amber as shown by equation (13) and also by short-term feedback (STAGE 1400).

Embodiment of the trend value (470) constitutes of representing difference between current KPI value and one datum point back in time as dictated by the set periodicity (460), is calculated with positive outcome setting the trend value (470) color to green, negative outcome setting the trend value (470) color to red and zero outcome setting the trend value (470) to color yellow. Trend value colors are independent of threshold value colors.

Embodiment of the trend arrow (472) constitutes of representing a positive trend value has the arrow color set to green and pointing cardinal north, negative value has the arrow color set to red and pointing cardinal south, and zero value has the arrow color set to yellow and pointing cardinal east.

Figure 8:
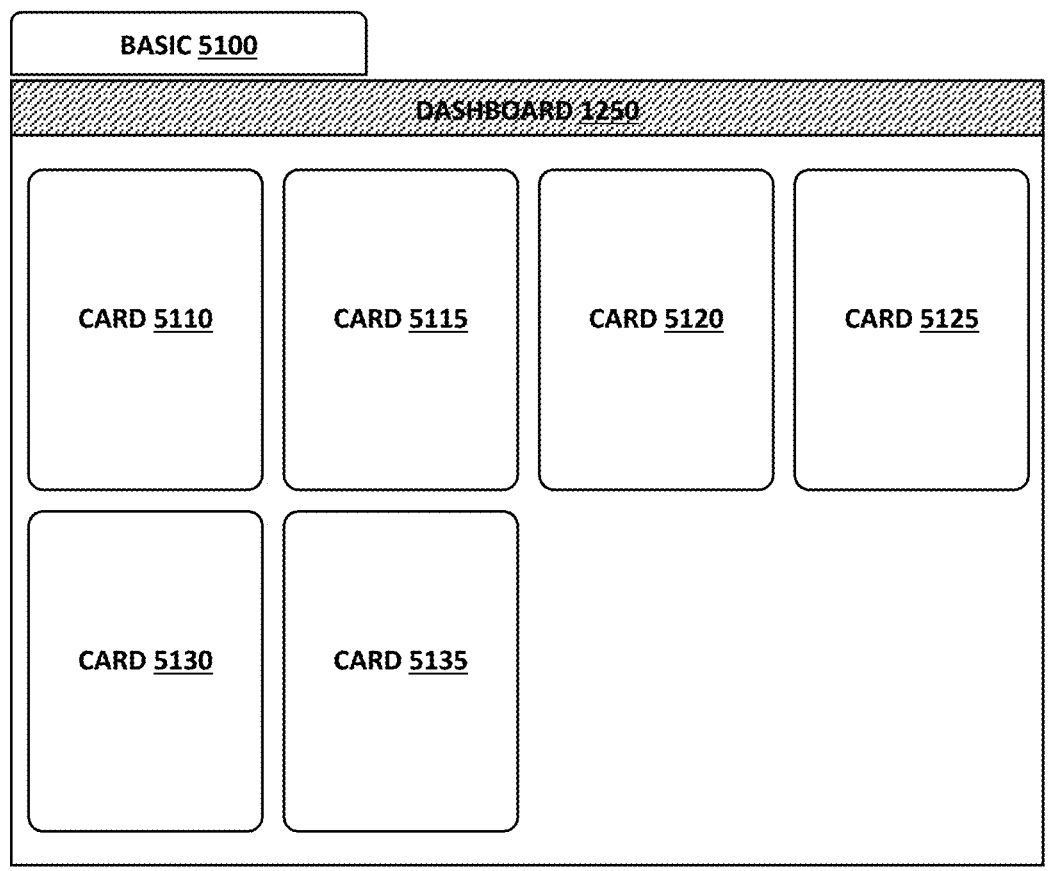
FIG. 8 illustrates an embodiment of a dashboard showing basic collection of CIS controls.

Continuing with our example, FIG. 8 captures the full gauge representation for KPI "Network Access Index". KPI value is 100 and falling within the range represented by equation (17), setting the color (490) to green. Subsequently, KPI value and liability lable are also set to green. Popup for KPI label renders the following message from the knowledgebase.

"INFERENCE: Protected state with operational background noise, if breached, it must be detected and quarantined by other service chain systems that perform deep correlation such as SIEM. On the other hand, due to configuration no unauthorized data is being collected."

In the example, CIS CSC 01 control is cross-referenced to A.9.1.2 which is the ISO 27001 standard selected. Popup for A.9.1.2 renders the following message.

"POLICY: Users shall only be provided with access to the network and network services that they have been specifically authorized to use."

In the dashboard embodiment (STEP 1250), selected threat vectors build a deck with assortments of cards matching CIS controls and each card constructed out of single or multiple gauges. Cards are collated and tabbed per group as shown in TABLE 7.

Figure 9:
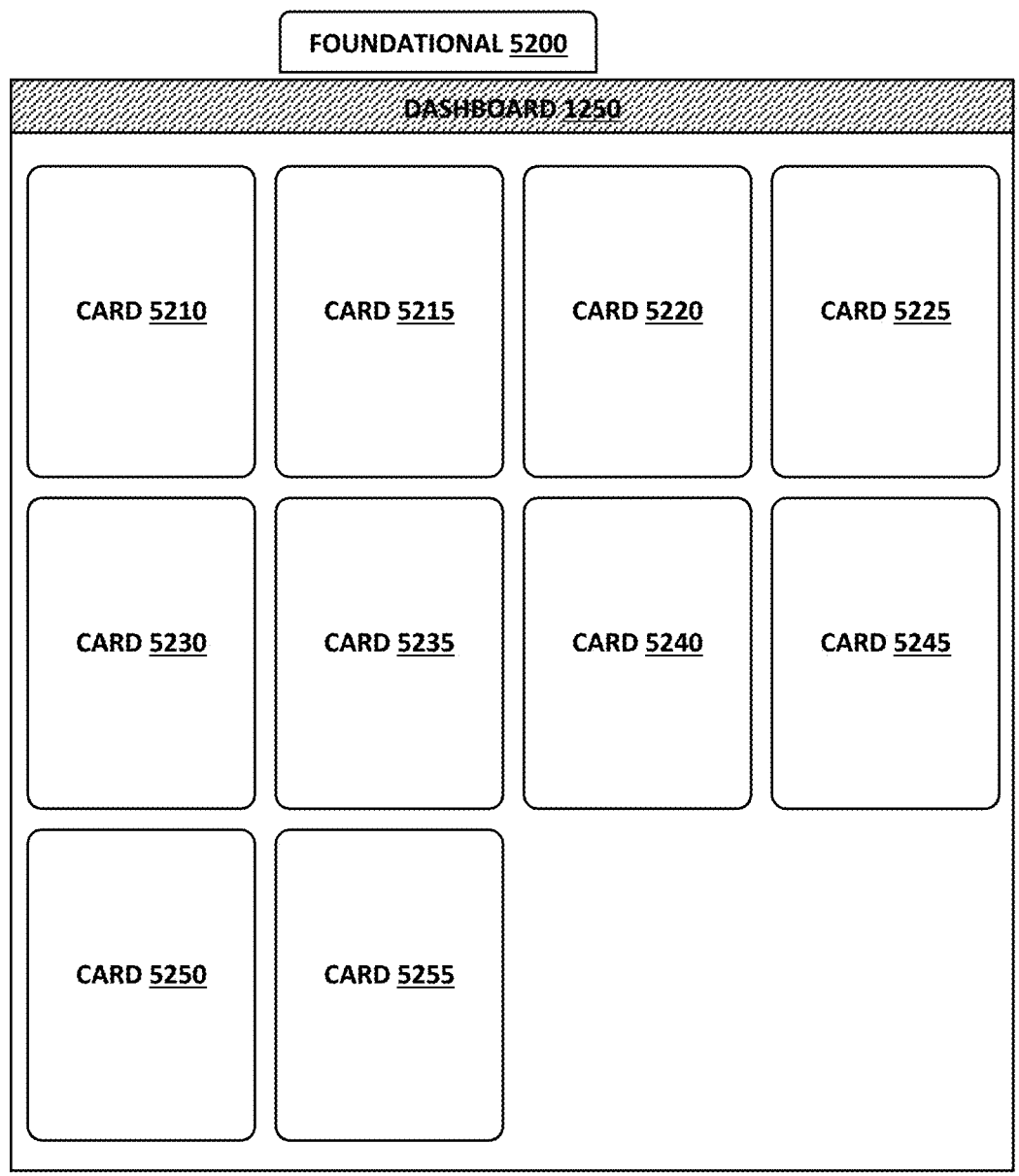
FIG. 9 illustrates an embodiment of a dashboard showing foundational collection of CIS controls.
Figure 10:
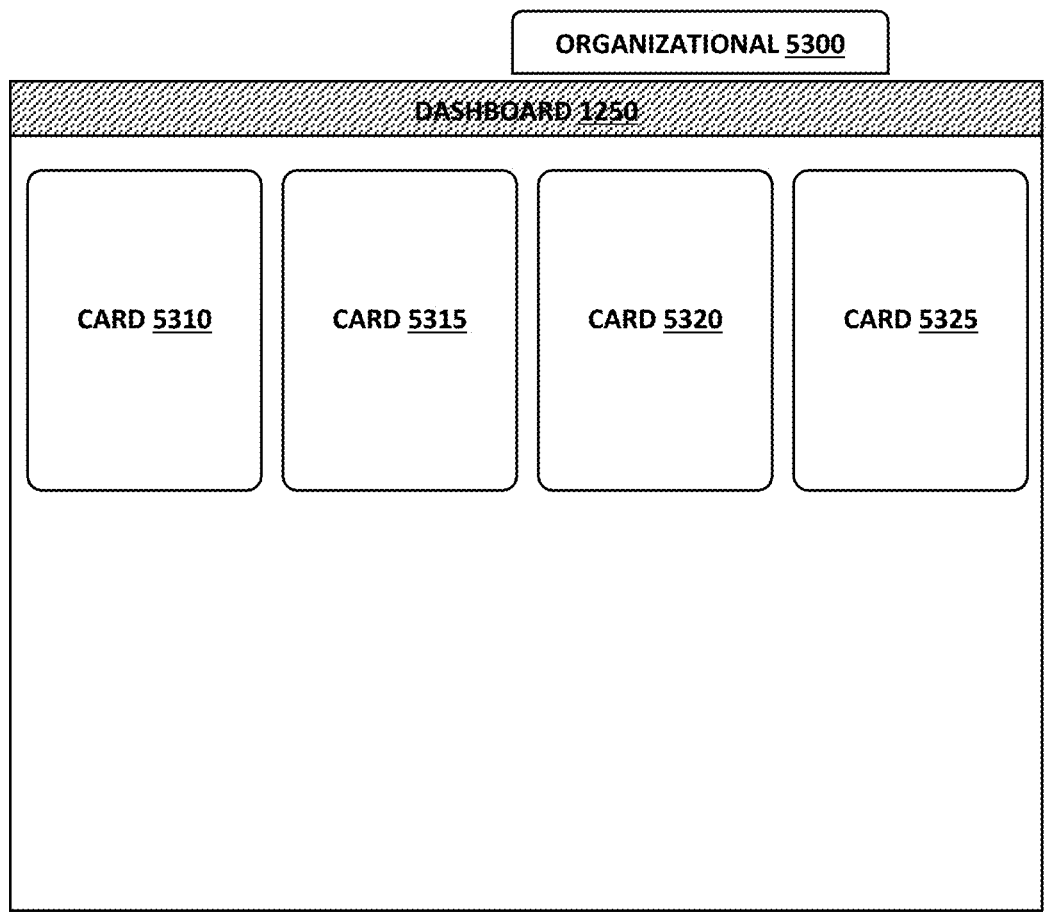
FIG. 10 illustrates an embodiment of a dashboard showing organizational collection of CIS controls.
Figure 11:
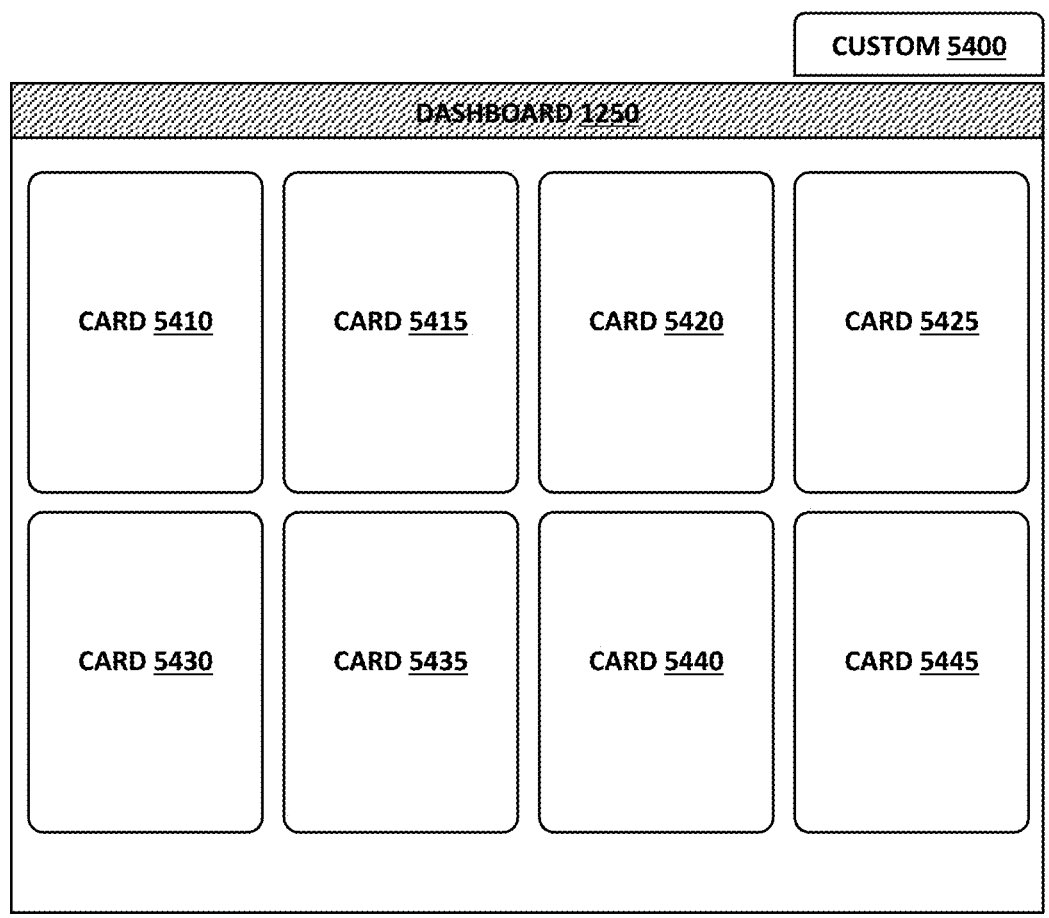
FIG. 11 illustrates an embodiment of a dashboard showing custom collection of CIS controls.

FIG. 8 is showing a dashboard (1250) with set of cards grouped under one tab as basic (5100). As per basic group from TABLE 6, it constitutes of six controls and each is represented by a card (5110), (5115), (5120), (5125), (5130) and (5135). FIG. 9 is showing a dashboard (1250) with set of cards grouped under one tab as foundational (5200). As per foundational group from TABLE 6, it constitutes of ten controls and each is represented by a card (5210), (5215), (5220), (5225), (5230), (5235), (5240), (5245), (5250) and (5255). FIG. 10 is showing a dashboard (1250) with set of cards grouped under one tab as organizational (5100). As per organizational group from TABLE 6, it constitutes of four controls and each is represented by a card (5310), (5315), (5320), and (5325). FIG. 11 is showing a dashboard (1250) with set of cards grouped under one tab as custom (5400). Custom group constitutes of customized controls that are generated as one off for a specific threat vector, business sector, or organization centric and is represented by a card (1230).

The example relates to building and displaying one KPI. However, it will be apparent to one of ordinary skill in the art that the invention embodies numerous KPIs. The invention may be implemented on virtually any type of computer regardless of the platform being used.

While the invention has been described with respect to a limited number of embodiments, one skilled in the art, having benefit of this disclosure, can appreciate that other embodiments can be devised which do not depart from the scope of the invention as disclosed herein. Accordingly, the scope of the invention should be limited only by the attached claims.

The invention claimed is:

1. A computer system for transforming plurality of cybersecurity standards to plurality of key performance indicators (KPI) for analytical treatment and through feedback, continuous improvement to security posture, comprising:
   a processor;
   a memory;
   and software instructions stored in the memory and configured to be executed by the processor to perform a method, the method comprising:
      an ecosystem, wherein a plurality of network hardware and virtual servers representing an organization's enterprise infrastructure is the basis for the method to act upon for analytical treatment;
      a transformation stage, wherein a plurality of cybersecurity standard policies is quantified and translated into quantitative key performance indicators (KPI) through a series of progressive steps consisting essentially of:
         a policy indexing step, wherein published cybersecurity standard policy controls and sub-controls are matched and linked for common policies across all standards, common policies with two or more connections and a matching Center for Internet Security (CIS) control is selected for inclusion for further processing;
         an identifying step, wherein common policies having unary representation, such as incremental count, or binary output, such as Boolean, are disregarded, remaining common policies with quantifiable unit values are mapped to identifiable data parameters that exist within the same ecosystem, the identified data parameter could be from one or more systems, later combined to yield a hybrid unit value;
         a collecting step, wherein a plurality of identified data parameter values being gathered periodically from the same ecosystem over at least one communications network;
         a computing step, wherein common policies associated with the same identified data parameters, and generating data, are converted to mathematical ratios by applying functions consisting essentially of:
            a simple division between two or more identified data parameters;
            one of the identified data parameters divided by sum of two or more of the same identified data parameters;
            or difference between the same two data parameters divided by sum of the same two data parameters;
         a testing step, wherein each computed ratio is mathematically bounded so that the representation is uniform and this is achieved through conditional treatment consisting essentially of:
            a normalization checking, wherein the ratio is treated for greater than one test leading to normalization of ratio under true conditions, normalization treatment encompasses ratio divided by square root of the sum of square of the ratio plus graph co-efficient factor, graph co-efficient factor defines the scale of the final embodiment and is set to one hundred, under false conditions the ratio is accepted as is, resulting in the ratio to be bounded within zero and one;
            a reversal checking, wherein each ratio is treated for zero as worst condition test leading to reversal of ratio under false conditions, reversal of ratio treatment includes subtracting from one, under true condition the ratio is accepted as is, post conditional testing the ratio is multiplied by one hundred;
            and a conditional checking, wherein if normalization and reversal checking show the ratio is spilling out of bounds, bounds being zero to one hundred, or negative one hundred to positive one hundred, resulting in looping back to the identifying step, if within bounds, proceeding to the next step;
         a classification step, wherein the ratio linked to a plurality of common polices is generating a numerical figure is referred to as an index when the identified data parameters have the same unit value but diametrically opposite, or referred to as a drift when the same identified data parameters have the same unit value but represent a portion of a total, or referred to as a rate when the same identified data parameters have different unit values;
         and a packaging step, wherein classified numerical figures or KPIs are periodically gathered and stored in a database forming a time-series of datum points that can be retrieved as hourly, daily, weekly or monthly sets of data;
      a presentation stage, wherein methods generating a plurality of KPIs are built through series of embodiment steps consisting essentially of:
         a collection of Center for Internet Security (CIS) controls, a prioritized set of actions that help protect organizations and its data from known cybersecurity threat vectors;
         a threat vector selection step, wherein single or multiple threat vectors are mapped and linked to one or many CIS controls identified in the collection of CIS controls, and through further extension linked to published cybersecurity standards from other governing organizations, a single CIS control is connected to at least one threat vector;
         a deck embodiment, wherein a set of single or multiple threat vectors selected from preceding step is represented as deck of card top face consisting essentially of:
            a label section, wherein a contextual pattern is representing a given title;
            and a heatmap section, wherein on the top face a heatmap representation is showing number of CIS controls engaged based on a plurality of threat vectors selected, and also displaying for each CIS control an index number and state of the CIS control as a color;
a card embodiment, wherein depiction of common policies grouped under a single CIS control, identified from the collection of CIS controls, as a card, belonging within a deck is consisting essentially of:
   a header section, wherein a contextual pattern is set to represent the same CIS control, an index number for the same CIS control, and an aggregate state for the card as color representation;
   a body section, wherein embodiment of KPI representation as collection of graphical personification;
   a footer section, wherein embodiment of legend representing visual aid for information being showing in the body section;
a gauge embodiment, wherein instrumentation of the same CIS control having a plurality of KPIs under one façade being rendered as graphical user interface (GUI) components consisting essentially of:
   a KPI label, wherein the label is associated with a KPI title, state as a color, and connecting to a best-practice knowledge base as a popup window offering possible a plurality of interpretations associated with the said KPI and state;
   a standard label, wherein the label is mapped to a different standard's control policy reference, and linked to the contextual representation of the policy as a popup window;
   a catalog list, wherein KPIs having sub-elements are listed, whereby each sub-element is offering popup windows displaying granular information in the form of tables, graphs, and charts;
   a threshold arc, wherein each scale divided into four discrete threshold ranges, referenced as red, amber, yellow and green, where amber start range, as default, is set to a seed value of seventy, as well as definable by the user as part of feedback control to regulate the said KPI, all other threshold ranges are computed through arithmetic-geometric series using amber value as starting point;
   a scale arc, wherein a graduation arc, with tick marks, is set to the graph co-efficient factor ranging from zero to one hundred, or negative one hundred to positive one hundred with zero as the median;
   a KPI arc, wherein an arc is rendered on the scale matching the current value and color of the arc set to the threshold range spectrum the current value is falling under;
   a scaffold arc, wherein the KPI is linked to secondary information and rendered along the arc;
   a periodicity label, wherein the selected time period for the KPI is indicated in the form of H for hourly, D for daily, W for weekly, and M for monthly;
   a KPI value, wherein the value represents the computed KPI value and the color for the rendered value is set to the threshold range spectrum the current value is falling under, and each computed KPI's datum is stored in a storage system in discrete time interval and extracted, and plotted, as a time-series of data viewable as historical graph over selected periodicity;
   a liability label, wherein a contextual representation is made matching color set to the threshold range spectrum the current value is falling under;
   a trend value, wherein difference between current KPI value and one datum point back in time as dictated by the set periodicity is calculated with positive outcome shown as green, negative outcome as red and zero outcome as yellow;
   and a trend arrow, wherein a trend value of positive has the arrow color set to green and pointing cardinal north, negative value has the arrow color set to red and pointing cardinal south, and zero value has the arrow color set to yellow and pointing cardinal east;
and a dashboard embodiment, wherein selected threat vectors portrayal, as a collection of cards and gauges, and slotted into the same CIS control groups, is offered for observation;
a business event stage, wherein collection of KPI's and offered interpretation is subjected to next step logical treatment by management of an organization, resulting in actions consisting essentially of:
   a short-term feedback loop, wherein a plurality of actionable tasks is changing plurality of KPI threshold values either being lowered or raised;
   and a long-term feedback loop, wherein a plurality of actionable tasks are impacting the same ecosystem, whereby impacting the data structure being collected in the form of inclusion or elimination of one or more systems, or governing standard are modified by the publishing body in-order to keep up with the ever changing cybersecurity landscape, or internal governing policy are amended, as part of the continuous improvement cycle to improve return on investment, posture, maturity, value chain, feedback, performance, and effectiveness of cybersecurity implementation.

2. The computer system of claim 1, wherein whilst defining a deck at least one threat vector is selected from a group consisting of:
   crimeware;
   denial of service;
   espionage;
   lost and stolen assets;
   miscellaneous errors;
   payment card skimmers;
   point of sale;
   privilege misuse;
   and web application attacks.

3. The computer system of claim 1, wherein liability indicator contextual pattern and color are set from a group consisting of:
   an actual liability message, wherein the contextual pattern is set to "actual liability" and contextual color set to red;
   a potential liability message, wherein the contextual pattern is set to "potential liability" and contextual color set to amber;
   a limited risk message, wherein the contextual pattern is set to "limited risk" and contextual color set to yellow;
   and risk remediated message, wherein the contextual pattern is set to "risk remediated" and contextual color set to green.

4. The computer system of claim 1, wherein trend indicator transition behavior is based on components consisting of:

an outcome, wherein the difference between current computed KPI value and one previous value generates an outcome;
a trend value color, wherein the color is set based on the difference outcome, negative outcome setting the trend value color to red, positive outcome setting the trend value color to green, and zero outcome setting the trend value color to yellow;
and a trend arrow, wherein a trend arrow mimics the same color behavior of trend value along with pointing to cardinal north for positive outcome, cardinal east for zero outcome, and cardinal south for negative outcome.

5. The computer system of claim 1, wherein in the embodiment of deck, card and gauge, KPI colors corresponding to threshold ranges is consisting of:
a red color, wherein range starts at zero inclusive and extends up to amber value exclusive, KPI value falling within the said range sets the base color to red;
an amber color, wherein range starts at amber value inclusive and extends up to mid-point between amber value and end of scale point of one hundred exclusive, mid-point being the yellow threshold value, KPI value falling within the said range sets the base color to amber;
a yellow color, wherein range starts at yellow value inclusive and extends up to mid-point between yellow value and end of scale point of one hundred exclusive, mid-point being the green threshold value, KPI value falling within the said range sets the base color to yellow;
and a green color, wherein range starts at yellow value inclusive and extends up end of scale point of one hundred inclusive, KPI value falling within the said range sets the base color to green.

6. The computer system of claim 1, wherein embodiment of a plurality of sub-element, in a gauge associated with a KPI, is consisting of:
a catalog, wherein embodiment of sub-elements in the form of a list associated with a KPI;
a catalog label, wherein the contextual pattern is representing sub-element title;
a weight factor, wherein in a said catalog, under default condition, all sub-elements have the same weight and the sum of the weights is equal to one, under custom conditions, one or more sub-elements have non-equal weights and the sum of the weights is equal to one;
and a catalog dialog popup window, wherein embodiment of data structure relating to sub-elements formatted and rendered in graph or tabular form.

7. A non-transitory computer-readable storage medium storing instruction for transforming plurality of cybersecurity standards to plurality of key performance indicators (KPI) for analytical treatment and through feedback, continuous improvement to security posture, comprising:
a processor;
a memory;
and software instructions stored in the memory and configured to be executed by the processor to perform a method, the method comprising:
an ecosystem, wherein a plurality of network hardware and virtual servers representing an organization's enterprise infrastructure is the basis for the method to act upon for analytical treatment;
a transformation stage, wherein a plurality of cybersecurity standard policies is quantified and translated into quantitative key performance indicators (KPI) through a series of progressive steps consisting essentially of:
a policy indexing step, wherein published cybersecurity standard policy controls and sub-controls are matched and linked for common policies across all standards, common policies with two or more connections and a matching Center for Internet Security (CIS) control is selected for inclusion for further processing;
an identifying step, wherein common policies having unary representation, such as incremental count, or binary output, such as Boolean, are disregarded, remaining common policies with quantifiable unit values are mapped to identifiable data parameters that exist within the same ecosystem, the identified data parameter could be from one or more systems, later combined to yield a hybrid unit value;
a collecting step, wherein a plurality of identified data parameter values being gathered periodically from the same ecosystem over at least one communications network;
a computing step, wherein common policies associated with the same identified data parameters, and generating data, are converted to mathematical ratios by applying functions consisting essentially of:
a simple division between two or more identified data parameters;
one of the identified data parameters divided by sum of two or more of the same identified data parameters;
or difference between the same two data parameters divided by sum of the same two data parameters;
a testing step, wherein each computed ratio is mathematically bounded so that the representation is uniform and this is achieved through conditional treatment consisting essentially of:
a normalization checking, wherein the ratio is treated for greater than one test leading to normalization of ratio under true conditions, normalization treatment encompasses ratio divided by square root of the sum of square of the ratio plus graph co-efficient factor, graph co-efficient factor defines the scale of the final embodiment and is set to one hundred, under false conditions the ratio is accepted as is, resulting in the ratio to be bounded within zero and one;
a reversal checking, wherein each ratio is treated for zero as worst condition test leading to reversal of ratio under false conditions, reversal of ratio treatment includes subtracting from one, under true condition the ratio is accepted as is, post conditional testing the ratio is multiplied by one hundred;
and a conditional checking, wherein if normalization and reversal checking show the ratio is spilling out of bounds, bounds being zero to one hundred, or negative one hundred to positive one hundred, resulting in looping back to the identifying step, if within bounds, proceeding to the next step;
a classification step, wherein the ratio linked to a plurality of common polices is generating a numerical figure is referred to as an index when the identified data parameters have the same unit value but diametrically opposite, or referred to as a drift when the same identified data parameters have the same unit value but represent a portion of a total, or referred to as a rate when the same data parameters have different unit values;

and a packaging step, wherein classified numerical figures or KPIs are periodically collect gathered and stored in a database forming a time-series of datum points that can be retrieved as hourly, daily, weekly or monthly sets of data;

a presentation stage, wherein methods generating plurality of KPIs are built through series of embodiment steps consisting essentially of:

a collection of Center for Internet Security (CIS) controls, a prioritized set of actions that help protect organizations and its data from known cybersecurity threat vectors;

a threat vector selection step, wherein single or multiple threat vectors are mapped and linked to one or many CIS controls identified in the collection of CIS controls, and through further extension linked to published cybersecurity standards from other governing organizations, a single CIS control is connected to at least one threat vector;

a deck embodiment, wherein a set of single or multiple threat vectors selected from preceding step is represented as deck of card top face consisting essentially of:

a label section, wherein a contextual pattern is representing a given title;

and a heatmap section, wherein on the top face a heatmap representation is showing number of CIS controls engaged based on plurality of threat vectors selected, and also displaying for each CIS control an index number and state of the CIS control as a color;

a card embodiment, wherein depiction of common policies grouped under a single CIS control, identified from the collection of CIS controls, as a card, belonging within a deck is consisting essentially of:

a header section, wherein a contextual pattern is set to represent the same CIS control, an index number for the same CIS control, and an aggregate state for the card as color representation;

a body section, wherein embodiment of KPI representation as collection of graphical personification;

a footer section, wherein embodiment of legend representing visual aid for information being showing in the body section;

a gauge embodiment, wherein instrumentation of the same CIS control having plurality of KPIs under one façade being rendered as graphical user interface (GUI) components consisting essentially of:

a KPI label, wherein the label is associated with a KPI title, state as a color, and connecting to a best-practice knowledge base as a popup window offering possible plurality of interpretations associated with the said KPI and state;

a standard label, wherein the label is mapped to a different standard control policy reference, and linked to the contextual representation of the policy as a popup window;

a catalog list, wherein KPIs having sub-elements are listed, whereby each sub-element is offering popup windows displaying granular information in the form of tables, graphs, and charts;

a threshold arc, wherein each scale divided into four discrete threshold ranges, referenced as red, amber, yellow and green, where amber start range, as default, is set to a seed value of seventy, as well as definable by the user as part of feedback control to regulate the said KPI, all other threshold ranges are computed through arithmetic-geometric series using amber value as starting point;

a scale arc, wherein a graduation arc, with tick marks, is set to the graph co-efficient factor ranging from zero to one hundred, or negative one hundred to positive one hundred with zero as the median;

a KPI arc, wherein an arc is rendered on the scale matching the current value and color of the arc set to the threshold range spectrum the current value is falling under;

a scaffold arc, wherein the KPI is linked to secondary information and rendered along the arc;

a periodicity label, wherein the selected time period for the KPI is indicated in the form of H for hourly, D for daily, W for weekly, and M for monthly;

a KPI value, wherein the value represents the computed KPI value and the color for the rendered value is set to the threshold range spectrum the current value is falling under, and each computed KPI's datum is stored in a storage system in discrete time interval and extracted, and plotted, as a time-series of data viewable as historical graph over selected periodicity;

a liability label, wherein a contextual representation is made matching color set to the threshold range spectrum the current value is falling under;

a trend value, wherein difference between current KPI value and one datum point back in time as dictated by the set periodicity is calculated with positive outcome shown as green, negative outcome as red and zero outcome as yellow;

and a trend arrow, wherein a trend value of positive has the arrow color set to green and pointing cardinal north, negative value has the arrow color set to red and pointing cardinal south, and zero value has the arrow color set to yellow and pointing cardinal east;

and a dashboard embodiment, wherein selected threat vectors portrayal, as a collection of cards and gauges, and slotted into the same CIS control groups, is offered for observation;

a business event stage, wherein collection of KPI's and offered interpretation is subjected to next step logical treatment by management of an organization, resulting in actions consisting essentially of:

a short-term feedback loop, wherein a plurality of actionable tasks is changing plurality of KPI threshold values either being lowered or raised;

and a long-term feedback loop, wherein a plurality of actionable tasks are impacting the same ecosystem, whereby impacting the data structure being collected in the form of inclusion or elimination of one or more systems, or governing standard are modified by the publishing body in-order to keep up with the ever changing cybersecurity landscape, or internal governing policy are amended, as part of the continuous improvement cycle to improve return on investment, posture, maturity, value chain, feedback, performance, and effectiveness of cybersecurity implementation.

8. A non-transitory computer-readable storage medium storing instruction of claim 7, wherein whilst defining a deck at least one threat vector is selected from a group consisting of:
crimeware;
denial of service;
espionage;
lost and stolen assets;
miscellaneous errors;
payment card skimmers;
point of sale;
privilege misuse;
and web application attacks.

9. A non-transitory computer-readable storage medium storing instruction of claim 7, wherein liability indicator contextual pattern and color are set from a group consisting of:
an actual liability message, wherein the contextual pattern is set to "actual liability" and contextual color set to red;
a potential liability message, wherein the contextual pattern is set to "potential liability" and contextual color set to amber;
a limited risk message, wherein the contextual pattern is set to "limited risk" and contextual color set to yellow;
and risk remediated message, wherein the contextual pattern is set to "risk remediated" and contextual color set to green.

10. A non-transitory computer-readable storage medium storing instruction of claim 7, wherein trend indicator transition behavior is based on components consisting of:
an outcome, wherein the difference between current computed KPI value and one previous value generates an outcome;
a trend value color, wherein the color is set based on the difference outcome, negative outcome setting the trend value color to red, positive outcome setting the trend value color to green, and zero outcome setting the trend value color to yellow;
and a trend arrow, wherein a trend arrow mimics the same color behavior of trend value along with pointing to cardinal north for positive outcome, cardinal east for zero outcome, and cardinal south for negative outcome.

11. A non-transitory computer-readable storage medium storing instruction of claim 7, wherein in the embodiment of deck, card and gauge, KPI colors corresponding to threshold ranges is consisting of:
a red color, wherein range starts at zero inclusive and extends up to amber value exclusive, KPI value falling within the said range sets the base color to red;
an amber color, wherein range starts at amber value inclusive and extends up to mid-point between amber value and end of scale point of one hundred exclusive, mid-point being the yellow threshold value, KPI value falling within the said range sets the base color to amber;
a yellow color, wherein range starts at yellow value inclusive and extends up to mid-point between yellow value and end of scale point of one hundred exclusive, mid-point being the green threshold value, KPI value falling within the said range sets the base color to yellow;
and a green color, wherein range starts at yellow value inclusive and extends up end of scale point of one hundred inclusive, KPI value falling within the said range sets the base color to green.

12. A non-transitory computer-readable storage medium storing instruction of claim 7, wherein embodiment of a plurality of sub-element, in a gauge associated with a KPI, is consisting of:
a catalog, wherein embodiment of sub-elements in the form of a list associated with a KPI;
a catalog label, wherein the contextual pattern is representing sub-element title;
a weight factor, wherein in a said catalog, under default condition, all sub-elements have the same weight and the sum of the weights is equal to one, under custom conditions, one or more sub-elements have non-equal weights and the sum of the weights is equal to one;
and a catalog dialog popup window, wherein embodiment of data structure relating to sub-elements formatted and rendered in graph or tabular form.

* * * * *